Sept. 2, 1952 G. F. RITTER 2,608,800
MARKING SURFACE
Filed Aug. 27, 1951 4 Sheets-Sheet 1
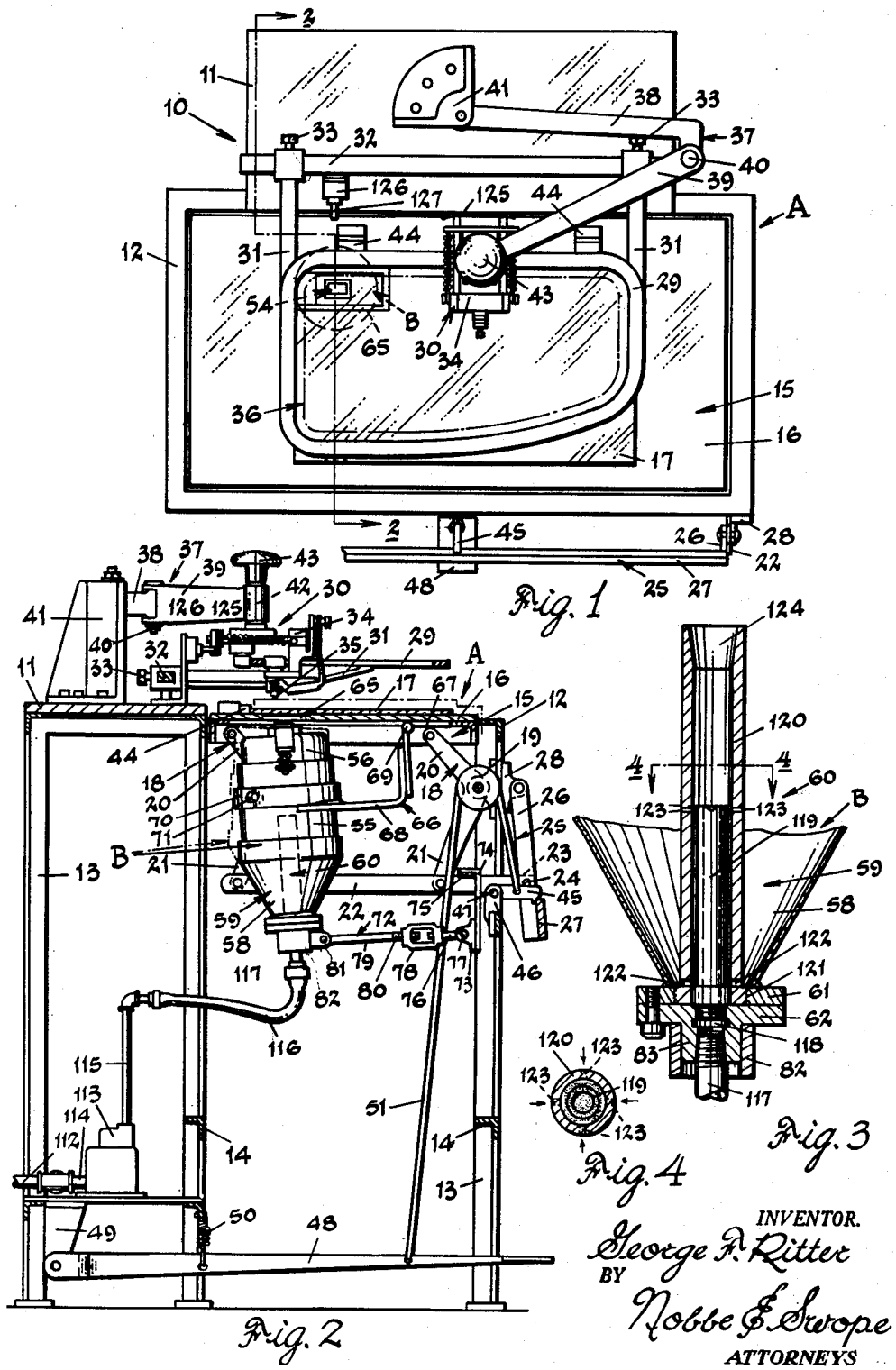

Sept. 2, 1952         G. F. RITTER         2,608,800
MARKING SURFACE
Filed Aug. 27, 1951         4 Sheets-Sheet 2
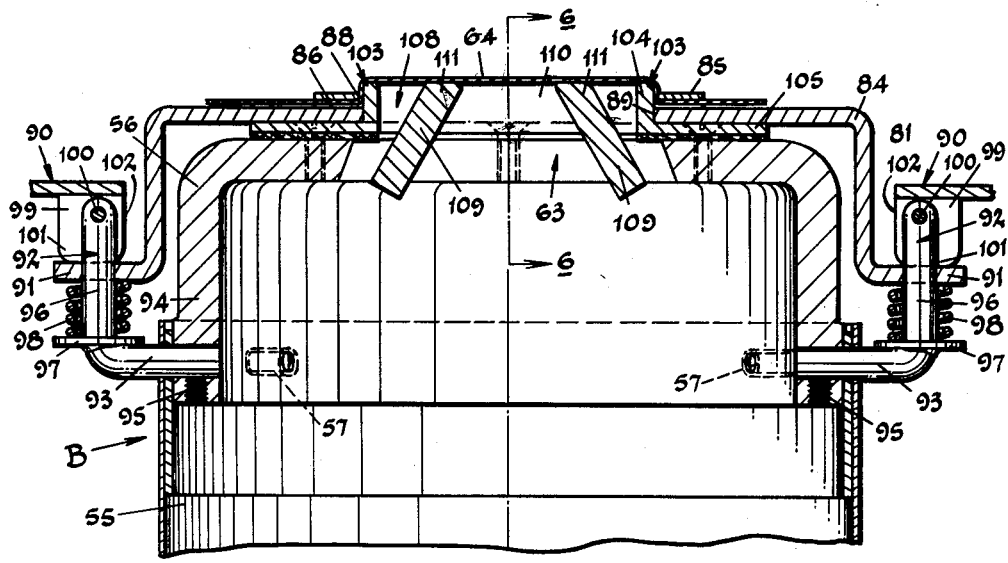
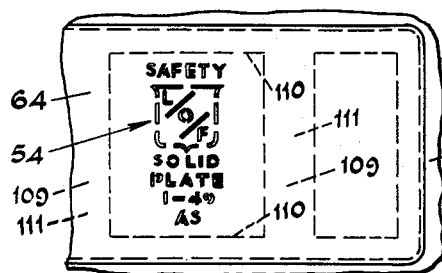
Fig. 5
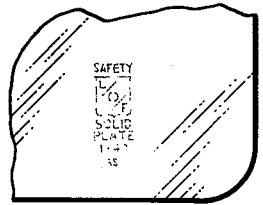
Fig. 8
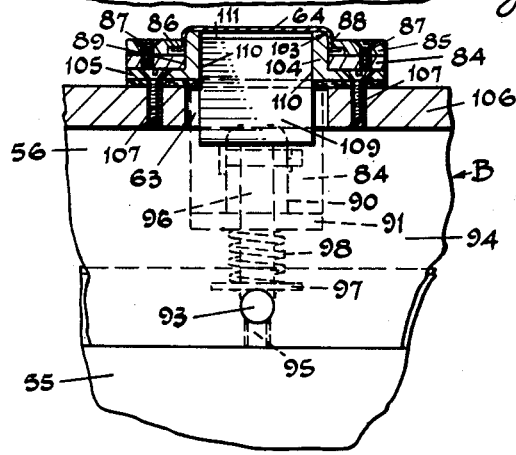
Fig. 6
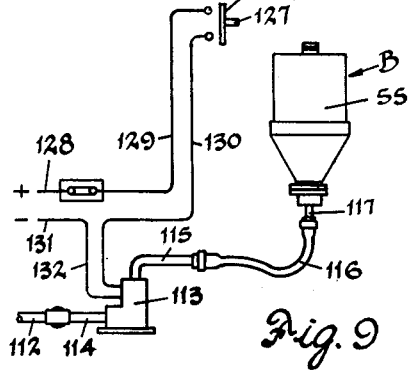
Fig. 9
INVENTOR.
George F. Ritter
BY Nobbe & Swope
ATTORNEYS Sept. 2, 1952  G. F. RITTER  2,608,800
MARKING SURFACE Filed Aug. 27, 1951  4 Sheets-Sheet 3

INVENTOR.
George F. Ritter
BY
Robbe E. Swope
ATTORNEYS

Sept. 2, 1952 G. F. RITTER 2,608,800
MARKING SURFACE
Filed Aug. 27, 1951 4 Sheets-Sheet 4
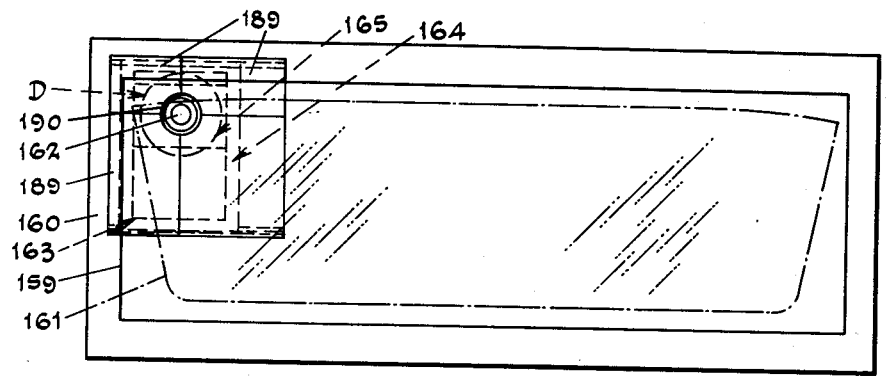
Fig. 15
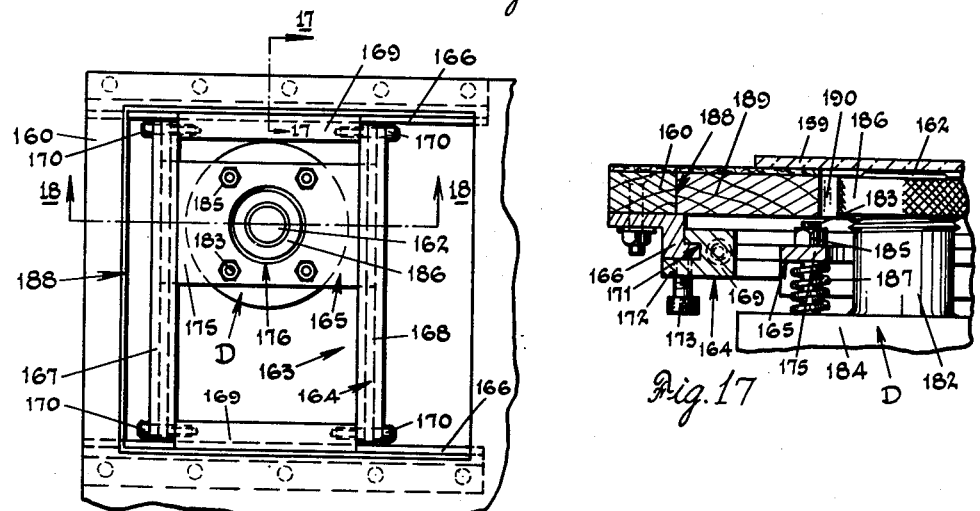
Fig. 16 Fig. 17
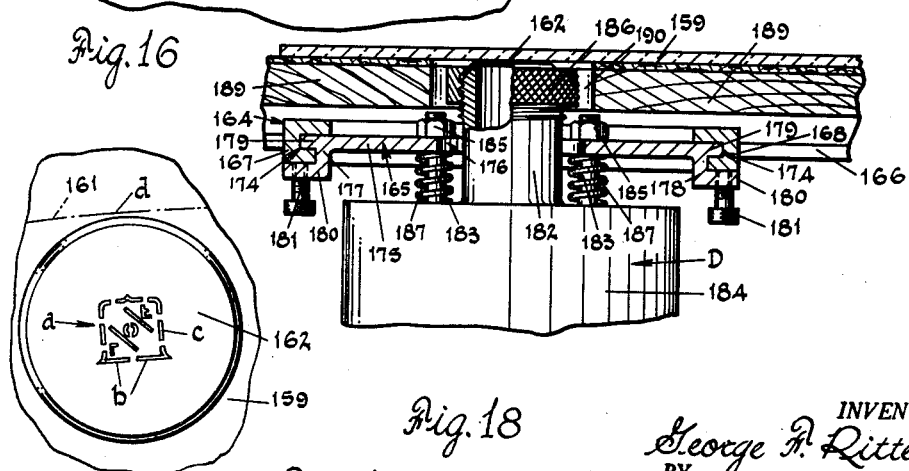
Fig. 18
Fig. 19
INVENTOR.
George F. Ritter
BY
Nobbe & Swope
ATTORNEYS Patented Sept. 2, 1952

2,608,800

UNITED STATES PATENT OFFICE 2,608,800

MARKING SURFACE

George F. Ritter, Toledo, Ohio, assignor to Libbey-Owens-Ford Glass Company, Toledo, Ohio, a corporation of Ohio Application August 27, 1951, Serial No. 246,899

14 Claims. (Cl. 51—5)

The present invention relates to the marking or decorating of surfaces, and more particularly to an improved apparatus for applying markings to an article during the processing thereof.

This application is a continuation-in-part of my application Serial No. 104,559, filed July 13, 1949, now abandoned.

Although not restricted to any particular use, the invention has proved valuable for use in the sandblasting of trade-marks and/or other distinguishing marks onto sheets of glass while they are being pattern-cut to size, and will be described in that connection herein. Briefly stated, the apparatus used for this purpose includes a conventional type of pattern cutting table for the glass sheets, and a special sandblasting device or devices which cooperate therewith to produce a stenciled mark on said sheets at the same time as they are being pattern-cut to a special outline form.

An important object of the invention is to provide, in combination, a machine for template cutting sheet glass and a novel sandblasting device which is operable automatically during the cutting cycle to etch a design on each glass sheet as it is being cut to a predetermined pattern.

Another object of the invention is to provide, in an apparatus of the above character, means for locating and supporting successive sheets of glass in an identical position on the cutting table so that the etched mark or design will appear in substantially the same area on each cut pattern when the waste portions have been removed therefrom.

Another object of the invention is to provide means whereby the stencil, bearing a trade-mark or other insignia, will be firmly positioned with respect to the glass during sandblasting to assure complete reproduction. Obviously, where the stenciled area is small and the characters formed therein are of single line, the stencil must be held in absolute aligning contact with the glass to prevent the blurring of any portion thereof. Irregularity, or blurring, is of course highly objectionable since it would be an impossibility to again sandblast the identical area to correct any imperfection.

A further object of the invention is to provide a control system for automatically producing the functions of the apparatus to the end that the stenciled design will be reproduced during, and in timed relation to the template cutting operation. As herein provided, the functioning parts of the sandblasting device are directly associated with the cutting table and are controlled by a switch which is actuated by the cutting element. This object then encompasses means for producing the sandblasting cycle within the cutting cycle so that one operation will be initiated and terminated between the start and completion of the other.

A still further object of the invention is to provide a sandblast apparatus wherein the functioning parts are accessible for adjustment and/or repair or immediate replacement. This is of particular importance with reference to the stencil bearing film which in time becomes worn due to the abrasive effects of the sandblasting medium.

Other objects and advantages of the invention will become more apparent during the course of the following description, when taken in connection with the accompanying drawings.

In the drawings wherein like numerals are employed to designate like parts throughout:

Fig. 1 is a top, plan view of a template cutting machine, showing the relative position of a trademark sandblasting device associated therewith;

Fig. 2 is a vertical transverse sectional view taken substantially on the line 2—2 in Fig. 1;

Fig. 3 is a detail sectional view of the trademark sandblast nozzle;

Fig. 4 is a horizontal sectional view taken substantially along the line 4—4 in Fig. 3;

Fig. 5 is a vertical sectional view through the upper end of the trade-mark sandblasting device; the section being taken along the longitudinal axis of the stencil support frame;

Fig. 6 is a transverse sectional view taken substantially along the line 6—6 in Fig. 5;

Fig. 7 is an enlarged, fragmentary top view of the trade-mark sandblasting device showing the stencil in operative position;

Fig. 8 is a fragmentary view of a corner of a glass sheet upon which an emblem or trade-mark has been produced by the apparatus of the invention;

Fig. 9 is a diagrammatic view illustrating the electric circuit for initiating the several operations of the cutting machine and the sandblasting device, or devices, in timed relation;

Fig. 15 is a plan view of a template cutting machine table, having a modified type of adjustable sandblasting device associated therewith;

Fig. 16 is a fragmentary enlarged plan view of one corner of the cutting table shown in Fig. 15;

Fig. 17 is a detail sectional view taken substantially on line 17—17 of Fig. 16;

Fig. 18 is a transverse sectional view taken substantially on line 18—18 of Fig. 16; and Fig. 19 is an enlarged detail view showing the relationship of the sandblasting stencil to the glass sheet.

Figure 10:
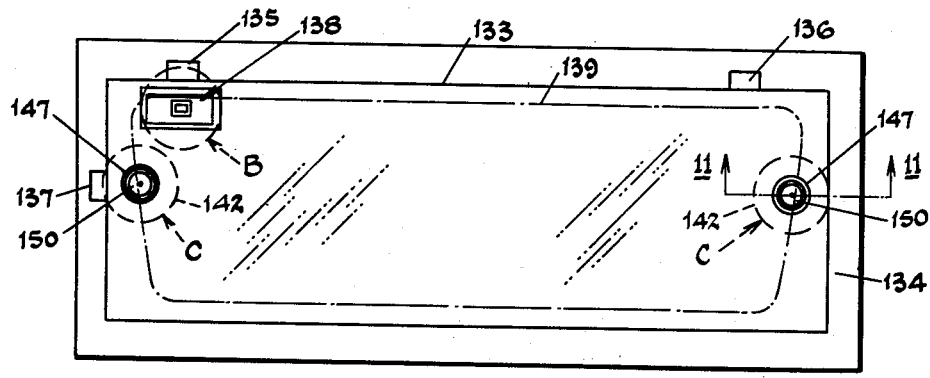
Fig. 10 is a top plan view of a template cutting machine table, having a plurality of sandblasting devices associated therewith.
Figure 11:
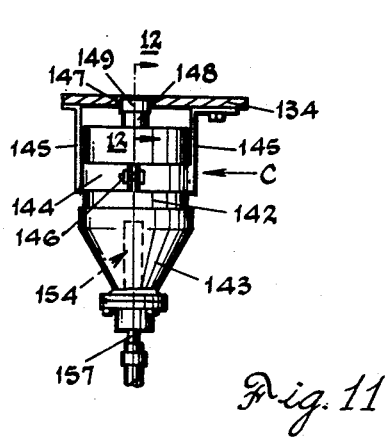
Fig. 11 is a vertical sectional view taken substantially along the line 11—11 in Fig. 10.

It is common practice to sandblast insignias or designs, in the form of images, or trade-marks, on a particular area of glass sheets for commercial identification, to inform purchasers or users of the source of the article and/or of the type of glass. In some instances the identifying mark also carries information as to its grade or the like.

Heretofore, this sandblasting was performed as a separate, usually semi-hand processing step, customarily after the other processing steps, and when the glass article was in finished condition.

According to the present invention, however, the sandblasting is a completely automatic operation, once the glass sheet has been properly positioned, and it may be, and preferably is, performed at the same time as the glass sheet is being subjected to another and different processing step. Moreover, proper positioning of the marking on the glass, and clarity of marking are assured and, in addition, the considerable time, handling and man power required in sandblasting as a separate operation will be eliminated.

With reference now more particularly to the drawings, there is disclosed in Figs. 1 and 2, a conventional type of pattern glass cutting apparatus, designated in its entirety by the letter A, with which, according to the invention, is operatively associated a sandblasting device B. The cutting apparatus includes a table 10 which comprises generally a flat, horizontal platform 11 and an open frame 12, both supported by suitable legs 13 which are reenforced by cross brace members 14. A vertically movable platform 15 is located within the open frame 12 and is provided with a felt covered top or surface 16 for supporting a glass sheet to be cut.

The platform 15, as shown in Fig. 2, is caused to lift a glass sheet 17, carried thereby into cutting position, by means of a plurality of bell-crank levers 18 that are arranged in the corner areas of said platform and rotatably supported by brackets 19 secured to the frame 12. The levers 18 are pivotally connected at the end of their arm 20 to the platform 15 and at the end of the opposite arm 21 are interconnected, in pairs at each end of said frame by links 22. The outer ends 23 of the links 22 are associated by pins 24 with a manually operable lever 25. The lever 25 comprises arms 26, to which the links 22 are connected, and a cross web 27 extending longitudinally across the front of the frame 12 and adapted to be engaged by the operator. The arms 26 are supported by brackets 28 secured to the legs 13 of the frame 12. The lever 25 is normally urged outward from the frame by the weight of the platform 15 acting through the bell-cranks 18 and the links 22.

Arranged above the top of the platform, in spaced relation thereto, is a horizontal track template 29 having the same configuration as the form of light to be cut from the sheet 17. As herein shown, the track template is provided in the form of a continuous, substantially rectangular loop, portions of the loop conforming to the desired pattern shape to be cut while the remainder of the loop affords a return section by which the cutting mechanism, as indicated at 30, moves from the completion of one cut to the starting position for a subsequent cut. The template is mounted on the platform 11, by means of a bracket 31 which is adjustably carried on a rail 32 and secured thereto by screws 33, which are threaded into the ends of the bracket and adapted to engage the adjacent surfaces of the rail 32.

The cutting mechanism 30, includes a cutting unit or head 34, provided with a rotatable steel, follower type, cutting wheel 35, said unit being adaptable to travel around the template 29 to score the glass sheet 17 along a line indicated at 36 in Fig. 1. The unit 34 is carried about the template and in uniform relation therewith by a swing arm 37. The swing arm comprises a pair of pivotally connected arm sections 38 and 39, coacting to open and close elbowwise about a connecting pin 40. As illustrated in Figs. 1 and 2, the arm section 38, at its end opposite the pin 40, is journaled in a bracket 41 mounted on the platform 11. The arm section 39 will accordingly be carried within the radial scope of the arm section 38 while being capable of an individual radial movement about the vertical axis of the pin 40. The outer end of the arm section 39 is formed to receive suitable journals for the supporting shaft 42 of the cutting mechanism 30. A hand knob 43 is rotatably connected to the end of the shaft 42 so that the cutting mechanism bodily may be easily actuated and caused to traverse the template 29 to produce the cut line 36 in Fig. 1.

In cutting a pattern on the particular construction of cutting table shown herein, a glass sheet 17 is placed on surface plate 16 of the platform 15, and is positioned against stops 44, which properly align said sheet with respect to the track template.

The platform 15 may then be raised to bring the glass sheet into effective scoring or cutting contact with the cutting wheel 35 of the cutting mechanism 30 by means of the bell-cranks 18 and as the operator bodily moves the lever 25 inwardly. When the platform 15 is thus raised, said lever 25 is engaged to hold the parts in their elevated association by a latch 45, carried by a bracket 46 secured to one of the brace members 14, and which is adapted to drop over the cross web 27 and prevent the lever 25 from returning to its outermost position. The latch is pivotally supported on the bracket 46 by a pin 47 and is swung relative to the bracket and upwardly from the web 27 of the lever 25 by means of a treadle 48. This treadle is pivotally supported in a bracket 49 and is normally urged upward by a spring 50 connected at one end to said treadle and at the opposite end to a cross beam 14. The latch and treadle are interconnected by a cable 51 that is trained intermediate its ends over a sheave 52 journaled on a shaft 53.

While the platform and glass sheet supported thereon are held in an elevated position by the bell-crank levers 18 and engagement of the lever 25 with the latch 45, the cutting mechanism 30 is moved around the template 29 until it has traversed the entire length thereof and the desired shape has been cut.

The operator then depresses the treadle 48 which, through the cable 51, lifts the latch 45 thereby allowing the lever 25 to swing freely and the weight of the platform to cause the descent thereof to the loading position where the glass sheet may be removed.

Now, according to the present invention, the trade-mark or other insignia is automatically sandblasted onto the glass sheet in the proper location, at the same time the pattern is being cut on the sheet, and without any attention from the cutting machine operator.

This is accomplished by means of the sandblasting device B, associated with the cutting table 10, and operating through a stencil band 54, to produce a mark as illustrated in Fig. 8.

The actual interval of the sandblasting operation is of relatively short duration and is initiated automatically by the cutting device 30 as it is passing over the area in which the device B is located. The sandblasting device B is disposed with reference to the track template 29 so that the stenciled mark 54 will be located accurately within the area eventually defined by the score or cut line 36 in the glass sheet 17.

The sandblast device B comprises an annular body portion 55, having an upper dome or closure cap 56 secured thereto by screws 57. The lower end 58 of the body 55 is conical or funnel shape to afford a reservoir 59 for the abrasive material, the inclined wall inducing a continual feeding toward a spray nozzle located therein and generally designated by the numeral 60. This nozzle is supported by a pair of plates 61 and 62, secured to the body 55 at its extreme lower end and is disposed so as to direct the abrasive material upwardly toward the cap 56 and more particularly toward a rectangular opening 63 formed therein, said opening being covered by the body portion 64 of the stencil, as will be more fully described hereinafter.

The annular body 55 of the sandblasting device B is supported on the platform 15 to locate the cap 56 thereof in alignment with an opening 65 in the top plate 16. The opening 65 is substantially rectangular in outline and is formed in the plate according to the desired disposition of the stencil on the supported glass. As shown in Fig. 1, one suitable location of the opening 65 is indicated and the device B, in alignment therewith, will be positioned to act within or adjacent one corner of the template outline. However, it is quite obvious that other locations may be selected and the opening 65 made in relation thereto.

The device B is carried on the platform 15 by a hinged bracket 66, having the base 67 thereof secured to the under surface of the plate 16. The other or pivotal member 68 of the bracket is supported thereon by a pintle 69 and has attached to its outer end a clamping strap 70 which encircles the body 55 of the device B. The ends of the strap 70 are interjoined by a nut and bolt connection 71 which is adapted to draw the ends together and firmly grip the body 55.

By means of the hinged bracket 66, the device B may be adjusted with reference to the opening 65 in, and to the upper surface of, the plate 16 and it is moved during adjustment by a threaded rod unit, generally indicated at 72, which is adapted to move the device by its own foreshortening or lengthening. The unit 72 comprises a bracket 73 secured to a strap 74 depending from a cross bar 75 connected at either end to the links 22; a swing bolt 76 pivotally supported in the bracket by a pin 77; a turnbuckle 78 carried by the swing bolt; and a rod 79 having a threaded end 80 turned into the turnbuckle. The opposite end of the rod 79 is pivotally connected by a pin 81 to a collar 82 located on the hub 83 of the plate 62. As the turnbuckle 78 is turned to move the rod 79 outwardly, the device B, pivoting by the member 68 of the bracket 66, will rise in the opening 65 in the plate 16 and, conversely, when the turnbuckle is turned in a reverse direction, the top of the device B will be lowered. Upon removal of the pin 77 from the bracket 73, the threaded rod unit 72 will be disconnected from said bracket and the device B may be swung downwardly and away from the plate 16 to afford easy access and repair.

By means of the hinged bracket 66 and the connection of the rod unit 72 to the links 22 by the cross bar 75, the sandblasting device is also swingable on said bracket 66 toward and away from the top plate 16 to dispose the top of the device well below the surface of the plate when placing and removing a glass sheet and also to move said device upwardly into contact with the glass sheet during the cutting thereof. This is accomplished through and by the bell-crank levers 18 since the arms 20 thereof are substantially shorter than the opposite arms 21. The arms 20, which carry the platform 15, will thus be moved through a shorter arc than the arms 21 and the sandblasting device B, being connected to the arms 21 through the rod unit 72 and cross bar 75 between the links 22, will be moved through a longer arc. As the platform is raised, the device B will accordingly be carried upwardly by the bracket 66 but since, at its lower end, the device is connected by the threaded rod unit 72 to the actuating bell-cranks 18, it will also be swung into a position shown by broken line in Fig. 2 so that its top surface will contact the glass plate.

When the sandblasting device is operatively supported on the carriage 15, as shown by broken line in Fig. 2, the cap 56 is axially aligned with the opening 65 of the plate 16. Preferably this opening is of sufficient size to accommodate a stirrup 84 which constitutes the retaining frame for the body portion 64 of the stencil. Usually these body portions for the stencils are supplied in flexible ribbon form, having an abrasive-resistant body portion to which are secured strips having the perforated design arranged therein. Alternatively, the stencil may be composed of a strip of material, such as a plastic, and have a series of perforated design areas spaced along at intervals in its length in order that quick replacement may be effected by sliding the strip along when one area becomes worn from the action of the abrasive material.

As herein provided, the body 64 of the stencil is carried by the stirrup 84 and is located thereon by means of a channeled plate 85, the band being inserted lengthwise through the channel 86. The plate 85 is secured on the stirrup by screws 87 to locate a rectangular opening 88 formed therein with registry with a similar opening 89 in the stirrup. The stirrup 84 is clampingly supported on the cap 56 by means of manually actuated levers 90 which are pivotally mounted with reference to the cap so that the said stirrup is vertically movable to release and secure the stencil body 64.

As shown particularly in Fig. 5, the stirrup 84 is bent downwardly, adjacent its ends, and then outwardly to provide engaging end surfaces 91 for the levers. The ends 91 of the stirrup and the levers 90 are carried by standards 92 which are formed of angularly bent rod. One leg of each standard, as indicated at 93, is secured in the side wall 94 of the cap 56 by screws 95 and extends outwardly therefrom while the opposed leg 96 rises vertically at substantially a right angle. At the juncture of the bend, the vertical leg 96 has a plate 97 secured thereon for supporting a spring 98.

The stirrup ends 91 are carried by the springs 98 and, when the ends are moved downward by the levers 90, they act to compress the springs, the distortion later causing a quick rise of the stirrup. To clampingly engage the stirrup ends 91, the levers have downwardly bent side portions 99 that are eccentrically supported by pins 100 in the legs 96 of the standards 92. The pins 100 are located in the side portions 99 of the levers so that when said side portions are in clamping relation with respect to the stirrup ends 91, the edges 101 of the side portions 99 will exert a downward thrust to force the ends 91 against the springs 98. When the levers are swung upwardly, the sides 102 being located nearer the pins 100 will reduce the clamping pressure and allow the force of the springs to lift the stirrup.

As the stirrup 84 is thus moved downward by action of the levers 90, the body 64 of the stencil is brought against and stretched over the rounded corners 103 of a wall 104 rising from a plate 105. The plate 105 is secured to the end wall 106 of the cap 56 by screws 107 and is provided with an opening 108, bounded by the wall 104, in registration with the opening 65 in the cap end wall 106. The effective area of the opening 108 of the plate 105 is reduced by deflectors 109 which are secured to the side portions 110 of the wall 104 and arranged to extend diagonally in upwardly converging planes. The deflectors will thus project downwardly through the opening 65 of the cap and outward to provide directional surfaces and a defining area for the abrasive medium as it is directed against the stencil. As shown in Fig. 7, the stencil design area 54 is thus located centrally in a space enclosed by the sides 110 of the wall 104 and the upper ends 111 of the deflectors 109.

The sandblasting device B, as herein provided, is constructed in the nature of a closed system in that the abrasive medium is confined within the body portion 55, particularly the reservoir 59, formed by the funnel-shaped bottom 58, and is, except for a minimum of loss, continuously used as it is drawn from said reservoir by means of the spray nozzle 60 during the stencil or sandblasting operation. More particularly, the spray nozzle 60 of device B is connected to an air pressure supply pipe 112 through an electrically actuated valve 113 by means of pipes 114 and 115 and the flexible tubing 116 between the pipe 115 and a pipe nipple 117 located in the hub 83 of the plate 62. The flexible tubing 16 is provided to compensate for the vertical movements of the device B and platform 15 to and from the operative cutting position with reference to the cutting unit 30 on platform 11.

The pipe nipple 117 is threaded into one end of a passageway 118 in the hub 83 which at its opposite end is threaded to receive one end of the air pipe 119 of the spray nozzle 60. A concentrically located director tube 120 is positioned in surrounding relation to the pipe 119, and is provided with a threaded end 121 by which it is supported in the plate 61. By careful control of the relative lengths and comparative diameters of the air pipe 119 and the director tube 120, it has been found possible to obtain a very effective abrasive output and resultant maximum spray pattern of predetermined shape while confining this action in a comparatively small sandblasting device.

Thus, the air pipe 119 preferably extends substantially half way upwardly within the director tube 120 and the air current created in the upper end of said tube produces a desired vacuous or aspirating condition in the lower end of the tube, in which the air pipe 119 is located, to draw the abrasive material from the funnel-shaped reservoir through aspirator holes 122 in the tube wall and to drive it upwardly through and out of the nozzle 60. These aspirator holes are diametrically opposed in the said wall and near the lower end thereof so as to withdraw the abrasive material from the reservoir 59 in the lower area or funnel-shaped end 58 of the device. As the abrasive material is drawn into the current or column of air under pressure, it is agitated by inrushing air drafts through four equally spaced ports 123 in the tube wall. These ports are arranged slightly below the top of the air pipe 119 so as to introduce extra air at the four equally spaced points as is shown in Fig. 4. This additional intake of air sets up a turbulence in the rising column of pressurized abrasive and also tends to flatten portions of this column until and as it approaches the flared end portion 124 of the tube 120, the column is shaped so as to emerge in a spray of a substantially square pattern which is directed against the stencil area 54.

In order to secure proper and distinct image definition in the sandblasted mark, and to avoid any possibility of sand being forced between the table top and the glass where it would scratch the surfaces of the glass plates as they are slid thereover, it is important that the portion of the glass plate to be sandblasted be held in close engagement with the platform top or plate 16 during the actual sandblasting cycle. To this end, operation of the device B, to sandblast the mark on the glass, is effected as the cutting wheel 35 is passing over the glass area to be stenciled and imposing a pressure on the glass sheet. The cutting unit 30 is adapted to cause operation of the device B during this interval of pressure whereby the glass sheet will be forced downward against the stencil band at the instant of sandblasting.

For this purpose, the cutting head 34 is provided with a contactor rail 125 (Fig. 1) which rail is adapted to engage a limit switch 126, that is supported on the platform 11. The plunger 127 of the switch is generally aligned with the stencil area 54 so that closure of the switch will be made as the cutting head is passing through this area.

The switch 126 controls the circuit of the electrically actuated air valve 113, and as shown diagrammatically in Fig. 9, the switch is connected to a positive main line 128 by line 129 and to the valve by line 130. When the switch is momentarily closed by the rail 125, a circuit will be completed from the source 128, through line 129, switch 126, line 130 to the valve 113 and thence to the negative main line 131 by line 132. This will open the valve 113 and permit air under pressure to be fed from the pipe 112, through a pipe 114, valve 113, pipe 115, flexible tubing 116 and pipe 117 to the nozzle 119, thus starting the sandblast. As previously pointed out, during the blasting operation, the wheel 35 of the cutting head is exerting sufficient downward pressure on the glass to force it into firm engagement with the stencil and also against the table top 16 thereby preventing the abrasive from escaping from the perforations of the stencil, under the glass, and outward onto the table top.

When the contactor rail 125 on the cutting head 34 is carried beyond the plunger 127 of the switch 126, the circuit through the valve 113 is opened which causes the valve 113 to close, and the sandblasting operation is stopped. The cutting device 30 then continues on to its starting position, after which the platform 15 is lowered by pressing the treadle 48 to lift the latch 45 from the cross web 27 of the lever 25. At the same time, the sandblasting device B is swung downwardly away from the top plate 16 so that the cut and blasted sheet can be slid from the lowered table without contact with the sandblasting device and consequent risk of being scratched thereby.

After the glass sheet has been taken from the cutting table and the marginal portions broken from the central portion along the line 36, the resulting stencil design will appear in one corner of the cut pattern substantially as shown in Fig. 8.

A further application of the invention is illustrated in Figs. 10 to 14 inclusive. As there shown, particularly in Fig. 10, a plurality of additional sandblasting devices are provided as indicated at C, which can be operated simultaneously with the trade-mark sandblasting device B for marking the cut glass sheet in a manner to facilitate further processing thereof.

For example, the glass sheet 133, shown in Fig. 10, is of a size that is adapted to be pattern cut into shapes for use in rear windows and/or front windshields for automobiles. Most of the pattern cut glass shapes for these purposes are subsequently processed as by bending, and, sometimes by tempering and, in view of their size and ultimate curved shape, must be properly balanced during the bending operation in the line of their center of gravity. In order to facilitate balanced mounting of the pattern cut sheets on the bending mold, it is customary to mark the sheet to indicate the so-called balance points. These balance points must be carefully determined, and it has been found advantageous to locate the same and to mark them on the glass sheet while the sheet is correctly positioned with reference to the pattern template which determines the pattern of the score or cut to be made on the sheet.

Thus, the platform 134 on which the glass sheet 133 is supported for pattern cutting is provided with locator blocks 135, 136 and 137 and, according to the invention a trade-mark sandblasting device B and balance point sandblasting devices C are located with reference thereto. The locator blocks 135 and 136 are adapted to position the side of the glass sheet 133, while the locator block 137 determines its position endwise, beneath the cutting template (not shown). The sandblasting device B is so supported on the platform 134 that the stencil area 138 thereof will produce an image adjacent one corner area, while the devices C are positioned to produce locator marks or dots at predetermined locations very near the score line 139 as shown at 140 in Fig. 14. It is preferable to locate the mark or dot 140 very near the edge of the cut pattern so that when the glass is installed in a window or windshield such dot or dots will not appear in the visibility area, the limits of which are indicated by a line 141.

The balance point sandblasting devices C may be different from the trade-mark sandblasting device B, and, as here shown, comprise generally an annular body 142 and a funnel-shaped lower end or abrasive container 143. The annular body is fixedly supported on the under side of the platform 135 by a girth 144 having flanges 145 bolted to said platform. The ends of the girth are drawn together by a nut and bolt connection 146 to rigidly grip the body 141 therein. Preferably the flanges 145 are formed and connected to the platform so that the top of the body portion of the devices will be axially aligned with openings 147 in the platform and slightly below the surface thereof.

At the exhaust or upper end of the devices C, a threaded tube 148 is formed integrally with the top of the body 141 and receives a closure ring 149 on its outer end. A diaphragm or sheet of expansible material 150, which may be rubber sheeting, and which serves as the stencil sheet, is disposed over the tube end and is stretched taut thereacross as the ring is turned downward on the threaded portion of the tube. The sheet material 150, is provided in its central area with a small opening 151 through which the abrasive is blown to produce the balance point markings on the glass.

At the lower end of the body 142, a pair of plates 152 and 153, similar to the plates 61 and 62 of Fig. 3, are secured to the container portion 143 thereby closing the same and supporting a spray nozzle 154. This nozzle, which comprises an air pipe 155 and tube 156, is vertically aligned with the tube 148 and is connected with a source of air pressure (not shown) by the pipe 157. The tube 156 of this form of nozzle also has abrasive feeding holes 158 located near its lower end through which the abrasive is drawn or aspirated into the air stream through the nozzle, and may in addition be provided with holes similar to the holes 123 of Fig. 3 in cases where it is desired to show the blast pattern.

Figure 12:
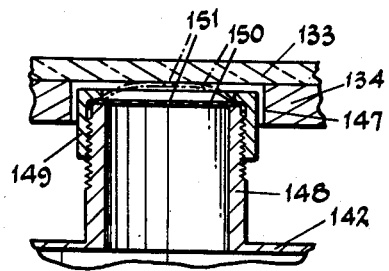
Fig. 12 is an enlarged sectional view taken substantially along the line 12—12 in Fig. 11.
Figure 13:
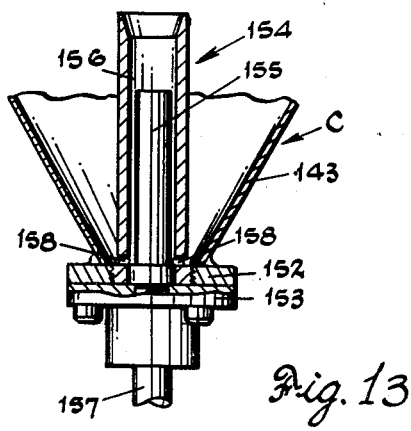
Fig. 13 is a detail view of a spray nozzle to be used with the sandblasting device shown in Fig. 11.
Figure 14:
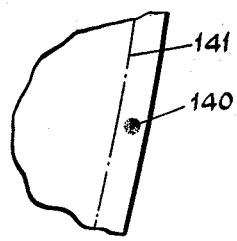
Fig. 14 is a fragmentary view of a glass sheet, showing the mark produced on the glass by the device of Fig. 11.

In operation, when air under pressure, carrying the abrasive particles is blown against the diaphragm 150 from the nozzle 153, the sheet material is distended, as shown in broken lines in Fig. 12 until it presses tightly against the glass sheet, and the abrasive passing through the opening 151 will mark the glass in the desired manner.

It will be seen from this that the operation of the devices C is different from that of the device B in that the devices C are not moved bodily toward and away from the platform 135. Nevertheless, the stencil portion of the devices will remain out of contact with the glass and below the top of the platform when the sheet is being slid into cutting position on the platform or is being slid from the platform after the cutting and sandblasting operations. This is because the diaphragm 150 normally lies against the top of the tube 148 except during actual sandblasting.

By connecting the pipe 157 of each of the devices C to the air supply through a suitable automatic valve such as the electrically actuated valve 113 and by the provision of suitable limit switches each of the devices C as well as the device B can be caused to operate at the instant that the cutting wheel is passing over the area to be sandblasted. Or, when the operation of the devices C does not exert sufficient force against the glass to require pressure from the top side to hold the sheet against the table, the pipes 157 can be attached to the valve 113 which will cause the devices C to be operated simultaneously with the device B.

In connection with the form of sandblasting device, heretofore designated generally by the letter C, it has been found in actual use that the diaphragm 150 thereof is equally well adapted to the stenciling of insignias, designs and/or trade-marks upon the glass where such indicia must be positioned in parallelism with an adjacent edge of the glass sheet which is cut in accordance with the template of the cutting table. By reason of the fact that a perforated diaphragm, of which the diaphragm 150 is typical, is securely held by the closure ring 149, it can be easily and rapidly shifted circularly once the ring 149 has been loosened on the threaded tube 148.

Thus, as shown in Fig. 15, a glass sheet 159 carried on the table 160 of the cutting machine may be scored along a line indicated at 161 to produce a pattern-cut sheet of the desired outline. It is preferred that the sandblasted trade-mark, or one or more particular lines therein, are parallel to a selected edge of the pattern-cut sheet. Such an arrangement is clearly illustrated in Fig. 19 wherein the stencil $a$ of the diaphragm 162 is positioned so that the line $b$ forming one border of the representative shield $c$, will be in substantial parallelism with the adjacent portion of the score line 161 as indicated at $d$. It will be noted that while the stencil $a$ appears inverted or upside down in Fig. 19, in relation to the score line 161, the resulting sandblasted trade-mark will appear properly in the finished glass sheet whether it is used as a windshield or rear window of an automobile, since the proximate edge 161 of the sheet will normally be employed as the lowermost edge when the same is installed.

In order to properly locate such a trade-mark with reference to the edge of the glass sheet, the sandblasting device herein designated D, is carried in a framework 163, which enables said device to be adjusted both longitudinally and transversely with reference to the table 160. This framework, as will be noted in Figs. 16 and 18, comprises an open, rectangular frame 164 and a carriage 165 movably supported therein. The frame 164 is slidably carried at its opposed ends by rails 166 secured in parallelism to the underside of the table 160.

More particularly, the frame 164 is formed by side rails 167 and 168 that are generally U-shaped in cross section and are secured at their ends to the end rails 169 by bolts 170 or the like. The end rails 169, as shown in Fig. 17, are also U-shaped in cross-section and are arranged so that the frame 164 will be supported on the rails 166 which are received in the outwardly disposed grooves 171 of the end rails 169. Preferably the lower leg 172 of each end rail is of greater width than the upper leg and this is for the purpose of threadably receiving set-screws 173. The grooves 174 formed by the U-shaped side rails 167 and 168 are arranged to extend inwardly to slidably support the carriage 165.

The carriage 165 is embodied in a substantially rectangular plate 175 having a centrally disposed aperture 176 formed therein. At the opposed sides of this plate, U-shaped members 177 and 178 are integrally affixed so that the upper legs 179 thereof will be received in the grooves 174 of side rails 167 and 168. In order that the carriage may be releasably secured relative to the rails 167 and 168, the lower legs 180 are equipped with set screws 181.

The sandblasting device D, in the present instance, is supported in suspended position on the carriage 165 so that the threaded tube 182 thereof will be concentrically disposed in and will extend upwardly through the aperture 176 in the plate 175. The sandblasting device is preferably mounted on the carriage by means of a plurality of threaded rods 183 that are secured to the top surface of the annular body 184 of the device D. The threaded rods 183 are received in suitable openings in the plate 175 and are provided above said plate with nuts 185 by which the device D is supported on the carriage.

By turning the nuts 185 along the threaded rods 183, it is possible to adjust the vertical position of the annular body 184 relative to the carriage 165 and, more particularly, the spaced distance of the diaphragm 162 from the under surface of the glass sheet on the table 160. This spacing is of vital importance to the production of a satisfactorily sandblasted insignia or trademark since the diaphragm 162, as in the case of the diaphragm 150, is distended during the operation and effective contact with the glass is necessary to obtain complete registration of the stencil. Also before and upon completion of the sandblast operation, the diaphragm must be sufficiently well beneath the surface of the table and/or the glass to avoid frictional wear that would be created by the loading and removal of the glass on the table as well as marring of the glass itself. The diaphragm 162 is supported upon the upper end of the threaded tube 182 and is clamped and stretched thereon by means of a ring nut or closure ring 186. When it is found desirable to change the parallel or angular relation of the stencil diaphragm to the edge of the glass sheet defined by the score line 161, loosening of the closure ring will permit a circular shifting of the diaphragm by the operator to the desired position.

Vertical movement of the sandblasting device D to obtain the proper spacing of the diaphragm from the glass is effected by the nuts 185 on rods 183 assisted by springs 187. These springs are expansible in character and are located on the rods between the plate 175 and the top of the annular body 184. When the nuts 185 are threaded outwardly along the rods 183, the springs will force the device D downwardly as they are permitted to expand. Likewise when the nuts are turned to move inwardly, the body 184 of said device will be raised and the springs compressed. Furthermore, the device D can be "leveled" by individual turning of the nuts 185 in varying degrees of movement along their related rods and the springs will act to stabilize the position of the sandblast device once its position is fixed.

The framework 163 is preferably located bodily adjacent one corner of the table 160 and the surface thereof is provided with an opening 188 of sufficient dimension to permit horizontal adjustment of the sandblasting device D by the frame 164 and the carriage 165 in both directions. The opening 188 is covered by special filler pieces 189 of felt covered wood blocks to complete the surface of the table once the device D has been properly located. The filler pieces 189 are shaped in their matching corners to form an opening 190 in which the threaded tube 182 is located and they are replaceable by similarly formed pieces when longitudinal and/or transverse adjustment of the device D in the framework 163 requires the positioning of a similar opening that will be substantially concentric with the tube 182.

In use and when changing templates on the cutting machine, the filler pieces 189 are removed to expose the framework 163. Upon loosening of the set-screws 173 and 181, the sandblasting device D may now be adjusted longitudinally by movement of the frame 164 along the rails 166 and transversely by movement of carriage 165 within the frame. The stencil diaphragm 162 is secured on the top of the threaded tube 182 by the ring nut or closure ring 186. The closure ring 186 when loosened, releases the stencil diaphragm 162 sufficiently so that it can be circularly shifted until the desired line or lines thereof are in parallelism with the score line 161 or more particularly that portion of the template immediately thereabove. This may be substantially as is shown in Fig. 19.

When these simple adjustments have been completed by tightening of the closure ring 186 to secure the stencil diaphragm 162 and the set screws 173 and 181 to secure the frame 163, the device D will be properly positioned for producing an image of the indicia adjacent the desired edge of the pattern-cut outline. Now, as previously hereinbefore set forth, when the electrically actuated valve 113 is caused to function, the air pressure supplied through pipe 157 will cause the diaphragm 162 to be distended upwardly against the surface of the glass sheet 159 and the image to be simultaneously produced by the abrasive particles carried by the air stream.

It is to be understood that the forms of the invention herewith shown and described are to be taken as illustrative embodiments only of the same, and that various changes in the shape, size and arrangement of parts, as well as various procedural changes may be resorted to without departing from the spirit of the invention or the scope of the subjoined claims.

I claim:

1. In a method of processing glass sheets, the steps of running a cutting tool over the upper surface of said sheet to score the same along a predetermined line, and applying an identifying mark on the bottom surface of said sheet adjacent said score line when said cutting tool is over the area to which the identifying mark is to be applied and is acting to hold said sheet against upward movement which might otherwise be caused by the application of said identifying mark.

2. In a method of processing glass sheets, the steps of running a cutting tool over the upper surface of said sheet to score the same along a predetermined line, and sandblasting an identifying mark on the bottom surface of said sheet adjacent said score line at the instant that said cutting tool is over the area to be sandblasted and is acting to hold said sheet against the blast.

3. In apparatus for processing a glass sheet, a platform for supporting said sheet and having an opening therein, a sandblasting device mounted beneath said platform in substantial alignment with said opening and operable to blast a mark on that portion of said sheet that lies above said opening, a cutting unit including a cutting tool movable over said sheet along a definite predetermined path to score the same, and means actuated by said cutting unit when it reaches a point in said path above said opening for operating said sandblasting device to blast said mark on the glass.

4. In apparatus for processing a glass sheet, a platform for supporting said sheet and having an opening therein, a sandblasting device including a stencil mounted beneath said platform in substantial alignment with said opening and operable to blast a stenciled mark, means for moving the stencil into contact with the lower surface of that portion of the glass sheet that lies above said opening, a cutting unit including a cutting tool movable over said sheet along a predetermined path to score the same, and means actuated by said cutting unit when it reaches a point in said path above said opening for operating said sandblasting device to blast a stenciled mark on the glass.

5. In apparatus for processing glass sheets, a platform for supporting said sheet and having an opening therein, a sandblasting device including a stencil and means for driving abrasive particles through said stencil mounted below said platform for movement toward and away from said opening, means for moving said sandblasting device bodily to bring the stencil into engagement with the lower surface of that part of the glass sheet that lies above said opening, a cutting unit including a cutting tool movable over said sheet along a predetermined path to score the same, and means actuated by said cutting unit when it reaches a predetermined point in said path for momentarily actuating said means for driving abrasive through said stencil.

6. In apparatus for processing glass sheets, a platform for supporting said sheet and having an opening therein, a sandblasting device including a stencil and means for driving abrasive particles through said stencil mounted below said platform for swinging movement toward and away from said opening, means for swinging said sandblasting device to bring said stencil into engagement with the lower surface of that part of the glass sheet that lies above said opening, and means for momentarily actuating said means for driving abrasive through the stencil while said stencil is in engagement with the glass sheet.

7. In apparatus for processing glass sheets, a platform for supporting said sheet and having an opening therein; a sandblasting device mounted below said platform in substantial alignment with said opening and including a stencil, a cylindrical sandblast nozzle in alignment with said stencil having feed openings in its side walls adjacent its intake end, a reservoir for abrasive in surrounding relation to said nozzle and communicating therewith through said feed openings, an air pipe mounted concentrically within said nozzle and terminating short of the discharge end thereof, a plurality of diametrically opposed openings in the side wall of said nozzle just below the top of said air pipe for creating a turbulence in the air from said air pipe and for shaping the pattern of the sandblast within said nozzle; and means for supplying air under pressure to said air pipe whereby to draw abrasive from said reservoir into said nozzle and to blast it through said stencil to stencil a mark on the glass.

8. In apparatus for processing a glass sheet, a platform for supporting said sheet and having an opening therein, a sandblasting device mounted below said platform for movement toward and away from said opening, said device including a stencil, a cylindrical blast nozzle in alignment with said stencil having abrasive feed openings in its side wall adjacent its intake end, a reservoir in surrounding relation to said nozzle and communicating therewith through said feed openings, an air pipe mounted concentrically within said nozzle and terminating short of the discharge end thereof, a plurality of diametrically opposed air holes in the side wall of said nozzle below the top of said air pipe for creating a turbulence in the air from said air pipe and for shaping the pattern of the sandblast, means for moving said sandblasting device to bring said stencil into engagement with that portion of the lower surface of said glass sheet lying over the opening in said platform, a cutting unit including a cutting tool movable over said sheet along a predetermined path to score the same, and means actuated by said cutting unit when it reaches a predetermined point in said path for momentarily supplying air under pressure to said air pipe whereby to draw abrasive from said reservoir into said nozzle and to blast it through said stencil to stencil a mark on the glass.

9. In apparatus for processing a glass sheet, a vertically movable platform having an opening therein for supporting said sheet, a sandblasting device swingably mounted on the under side of said platform for movement toward and away from said opening, said device including a stencil, a cylindrical blast nozzle in alignment with said stencil having abrasive feed openings in its side wall adjacent its intake end, a reservoir for abrasive in surrounding relation to said nozzle, an air pipe mounted concentrically within said nozzle and having an open end terminating short of the discharge end of the nozzle, two pairs of diametrically arranged air holes in the side wall of said nozzle just below the open end of said air pipe, a cutting unit including a cutting tool mounted above the glass sheet on the platform for movement thereover along a definite horizontal path, means for moving said platform to bring the glass sheet carried thereby into scoring contact with said tool, means for swinging said sandblasting device to bring said stencil into engagement with the lower surface of that part of the glass sheet that lies above the opening in the platform, and means actuated by said cutting unit when it reaches a predetermined point in said path for supplying air under pressure to said air pipe.

10. In apparatus for processing a glass sheet, a platform for supporting said sheet and having an opening therein, a sandblasting device including an expansible stencil and means for driving abrasive against said stencil mounted with the stencil within said opening but below the lower surface of a glass sheet supported thereon, a cutting unit including a cutting tool movable over said sheet along a predetermined path to score the same, and means actuated by said cutting unit when it reaches a predetermined point in said path for momentarily actuating said means for driving abrasive against said stencil whereby to expand said stencil into contact with the glass surface and to stencil a mark thereon.

11. In apparatus for processing a glass sheet, a platform for supporting the sheet and having an opening therein, a marking device mounted beneath said platform in substantial alignment with said opening and operable to apply an identifying mark on that portion of said sheet that lies above said opening, a cutting unit including a cutting tool movable over said sheet along a definite predetermined path to score the same, and means actuated by said cutting unit when it reaches a point in said path above said opening for operating said marking device to apply said identifying mark on the glass.

12. In apparatus for processing a glass sheet, a platform for supporting said sheet and having an opening therein, a sandblasting device mounted beneath said platform in substantial alignment with said opening and operable to blast a mark on that portion of said sheet that lies above said opening, a cutting unit including a cutting tool movable over said sheet along a definite predetermined path to score the same, means actuated by said cutting unit when it reaches a point in said path above said opening for operating said sandblasting device to blast said mark on the glass, and means for mounting the said sandblasting device for horizontal adjustment both longitudinally and transversely of said platform.

13. In apparatus for processing a glass sheet, a platform for supporting the sheet and having an opening therein, a sandblasting device including a stencil mounted beneath said platform in substantial alignment with said opening and operable to blast a stenciled mark upon the glass, a cutting unit including a cutting tool movable over said sheet along a predetermined path to score the same, means actuated by said cutting unit when it reaches a point in said path above said opening for operating said sandblasting device to blast the stenciled mark on the glass, and means for supporting the stencil so that it can be shifted circularly to vary the position of said stencil with respect to an adjacent edge of the glass sheet.

14. In apparatus for processing a glass sheet, a platform for supporting the sheet and having an opening therein, a sandblasting device including a stencil positioned beneath said platform in substantial alignment with said opening, a tubular member upon the upper end of which the stencil is supported and means for securing the stencil to the tubular member so that it can be shifted circularly with respect to the latter to vary the position of said stencil with respect to an adjacent edge of the glass sheet, a cutting unit including a cutting tool movable over said sheet along a predetermined path to score the same, and means actuated by said cutting unit when it reaches a point in said path above said opening for operating said sandblasting device to blast a stenciled mark on the glass.

GEORGE F. RITTER.

No references cited.